No. 659,274. Patented Oct. 9, 1900.
C. A. WILLIAMS.
SHORT TURNING GEAR.
(Application filed Apr. 5, 1900.)

(No Model.)

Witnesses
A. G. Heyfman.
E. H. Bates

Inventor
Charles A. Williams
By Attorney Herbert W. T. Jenner.

UNITED STATES PATENT OFFICE.

CHARLES A. WILLIAMS, OF RANDOLPH, VERMONT.

SHORT-TURNING GEAR.

SPECIFICATION forming part of Letters Patent No. 659,274, dated October 9, 1900.

Application filed April 5, 1900. Serial No. 11,696. (No model.)

*To all whom it may concern:*

Be it known that I, CHARLES A. WILLIAMS, a citizen of the United States, residing at Randolph, in the county of Orange and State of Vermont, have invented certain new and useful Improvements in Short-Turning Gears; and I do hereby declare the following to be a full, clear, and exact description of the invention, such as will enable others skilled in the art to which it appertains to make and use the same.

This invention relates to short-turning gear for vehicles; and it consists in the novel construction and combination of the parts hereinafter fully described and claimed.

Figure 1:
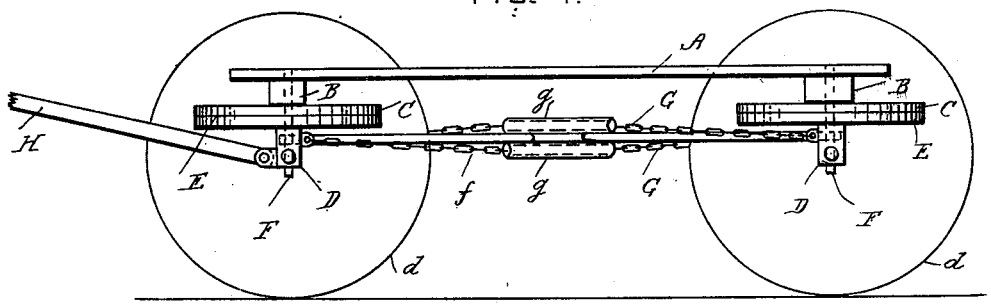
Figure 2:
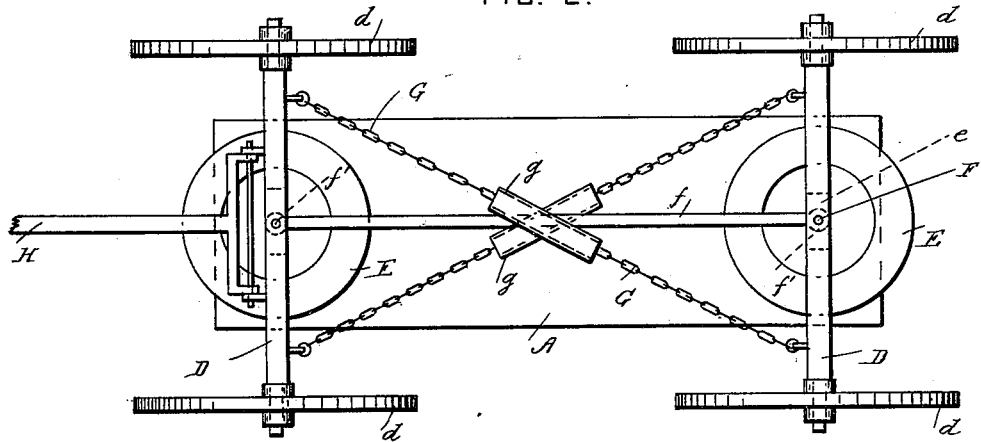
Figure 3:
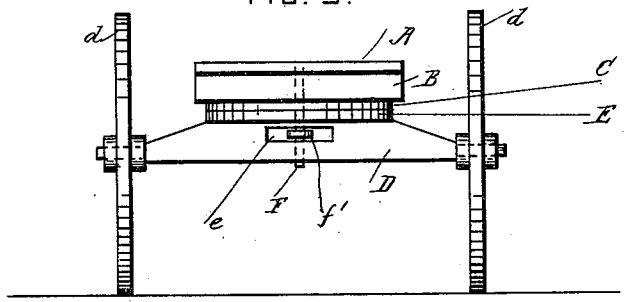

In the drawings, Figure 1 is a side view of a vehicle constructed according to this invention with two of the wheels removed. Fig. 2 is a plan view of the vehicle from below. Fig. 3 is an end view of the vehicle.

A is a portion of the vehicle-body, and B indicates cross-pieces secured on the under side of same near its ends.

C indicates turn-plates secured to the under sides of the cross-pieces B.

D indicates the axles, and $d$ indicates the wheels on the ends of the axles.

E indicates turn-plates secured to the upper sides of the axles and bearing against the turn-plates C.

F indicates pivot-pins, which pivot the axles to the cross-pieces B.

Each axle is provided with a horizontal slot $e$ at its middle portion, and $f$ is a bar provided with eyes $f'$ at its ends, which are inserted in the slots $e$ and engage with the pins F.

G indicates flexible connections, such as chains, which are crossed at the middle part of the vehicle under its body and have their ends pivoted to the opposite end portions of the axles D. Tubular guides $g$ are provided for the chains to slide in. One tubular guide is secured to the upper side of the bar $f$ and the other to the under side of the said bar. The tubular guides are crossed, and they operate to support the chains and prevent them from conflicting with each other.

H is the tongue, which is connected to the front axle. When the front axle is moved in one direction by means of the tongue, the rear axle is moved forcibly to an equal extent in the opposite direction by means of the chains, so that the vehicle can turn sharp corners and can be turned around in a very short space.

What I claim is—

The combination, with a vehicle-body, and cross-pieces B and turn-plates C secured to the end portions thereof; of axles and turn-plates pivoted under the aforesaid turn-plates, a bar $f$ arranged below the turn-plates and engaging with the axle-pivots, two guide-tubes secured respectively to the upper and lower sides of the bar $f$ and crossing each other, and crossed flexible connections passing through the said guide-tubes and secured to the end portions of the axles, substantially as set forth.

In testimony whereof I affix my signature in presence of two witnesses.

CHARLES A. WILLIAMS.

Witnesses:
O. W. C. BLANCHARD,
B. D. CHADWICK.